United States Patent [19]
Hamagishi

[11] Patent Number: 5,855,425
[45] Date of Patent: Jan. 5, 1999

[54] STEREOSCOPIC DISPLAY

[75] Inventor: Goro Hamagishi, Toyonaka, Japan

[73] Assignee: Sanyo Electric Co., Ltd., Osaka-fu, Japan

[21] Appl. No.: 895,813

[22] Filed: Jul. 17, 1997

[30] Foreign Application Priority Data

Jul. 19, 1996 [JP] Japan ..................................... 8-191145

[51] Int. Cl.⁶ ................................................. G03B 21/14
[52] U.S. Cl. ................................ 353/7; 353/94; 359/464; 359/477
[58] Field of Search ................................ 353/7, 10, 94; 359/463, 464, 466, 473, 475, 477, 458

[56] References Cited

U.S. PATENT DOCUMENTS

| | | | |
|---|---|---|---|
| 4,872,750 | 10/1989 | Morishita ..................................... | 353/7 |
| 5,125,733 | 6/1992 | Lee ............................................. | 353/7 |
| 5,465,175 | 11/1995 | Woodgate et al. ....................... | 359/464 |
| 5,568,313 | 10/1996 | Steenblik et al. ........................ | 359/463 |
| 5,663,831 | 9/1997 | Mashitani et al. .......................... | 353/7 |

Primary Examiner—William Dowling
Attorney, Agent, or Firm—Nikaido, Marmelstein, Murray & Oram LLP

[57] ABSTRACT

A left eye image is projected from a projector 1L, and a right eye image is projected from a projector 1R. The images projected from the projectors 1L and 1R pass through light transmitting portions 21 in light shading means 2a. Consequently, pairs of right and left eye images are formed on a dispersion panel 2b. The light shading means 2a is composed of a liquid crystal display panel, for example. The width of each of the light transmitting portions 21 is made so small that two or more pairs of right and left eye images can exist in each of predetermined regions of the dispersion panel 2b. Further, the position of each of the light shading portions 21 can be shifted in the transverse direction. Each of the pairs of right and left eye images formed on the dispersion panel 2b is introduced into the right and left eyes of a viewer upon being separated by a lens portion of a lenticular lens 2c. A sensor 10 detects the position of the viewer. A driving and control unit 12 changes the positions of the light transmitting portions 21 in the light shading means 2a on the basis of an output of the sensor 10.

13 Claims, 13 Drawing Sheets

STEREOSCOPIC DISPLAY

BACKGROUND OF THE INVENTION

1. Field of the Invention

The present invention relates to a stereoscopic display capable of viewing a stereoscopic image without using special glasses.

2. Description of the Prior Art

As a method of realizing display of a stereoscopic image without requiring special glasses, a method of a double lenticular system using two liquid crystal display (LCD) projectors as well as using a double lenticular screen as a screen has been proposed. This system is a system of respectively displaying a left eye image and a right eye image from one LCD projector 1a and the other LCD projector 1b, and projecting the images on a double lenticular screen 200 arranged ahead of the projectors, as shown in FIG. 10. The double lenticular screen 200 is so constructed that lenticular screens 200a and 200c are arranged ahead of and behind a dispersion panel 200b on which the images are formed such that the dispersion panel 200b is interposed therebetween.

The left eye image and the right eye image are respectively changed into vertically striped images 200bL and 200bR by the function of the lenticular screen 200a on the side of the LCD projectors 1a and 1b (on the incidence side), and are alternately formed on the dispersion panel 200b. The right eye striped image and the left eye striped image out of the vertically striped images formed on the dispersion panel 200b are introduced upon being respectively separated into the right eye (3R) and the left eye (3L) of a viewer 3 by the function of the lenticular screen 200c arranged on the light emission side of the dispersion panel 200b (on the side of the viewer). The viewer who views the left and right eye striped images with his or her respective eyes can view a stereoscopic image without wearing special glasses by the function of binocular parallax.

In this type of stereoscopic display, regions where a right eye image or a left eye image can be viewed alternately exist at the optimum viewing distance (D) from a screen 200, as shown in FIG. 11. In FIG. 11, a range indicated by an arrow R is a right eye image viewing region, and a region indicated by an arrow L is a left eye image viewing region. When the right eye 3R and the left eye 3L of the viewer 3 are respectively in the R region and the L region (a position indicated by A), a stereoscopic image can be viewed. On the other hand, in the reverse case (a position indicated by B), a stereoscopic image cannot be viewed due to reversed view.

As a method of preventing a reversed view state created by the shift in the position of the head of the viewer, a method of detecting the position of the head of a viewer 3 by a sensor 100 for detecting the position of the head of the viewer 3, and replacing the right and left images displayed by the LCD projectors 1a and 1b (which are not illustrated in FIGS. 12 and 13) when it is judged that the head of the viewer 3 is in a reversed viewing position, for example, has been conventionally known, as shown in FIGS. 12 and 13. That is, when the position of the viewer 3 is changed from a just image viewing position as shown in FIG. 12 to a reversed viewing position, the right and left eye images displayed are replaced with each other, as shown in FIG. 13. Consequently, an image viewing region R indicated by a rhombus is positioned in the position of the right eye of the viewer, and an image viewing region L indicated by a rhombus is positioned in the position of the left eye of the viewer.

In the above-mentioned prior art, however, means for replacing the right and left images with each other is required. A large screen display is viewed by a plurality of viewers in many cases. In this case, when only one of the viewers moves, and the right and left images are replaced with each other by its head tracking, the other viewers in just image viewing positions cannot view a proper image.

The present invention has been made in view of the above-mentioned circumstances, and has for its object to provide a stereoscopic display requiring no means for replacing right and left images with each other and capable of properly viewing, even when it is viewed by a lot of viewers, a stereoscopic image by each of the viewers.

SUMMARY OF THE INVENTION

A stereoscopic display according to the present invention is characterized by comprising a first projector for projecting a left eye image, a second projector for projecting a right eye image, a dispersion panel on which the images projected from the projectors are formed, light shading means having a plurality of light transmitting portions for transmitting image light beams from the projectors to form pairs of right and left eye images on the dispersion panel, and being so constructed that the width of each of the light transmitting portions is so small that two or more pairs of right and left eye images can exist in each of predetermined regions of the dispersion panel, and the position of each of the light transmitting portions can be shifted in the transverse direction, separating means comprising separating function portions respectively corresponding to the predetermined regions for introducing the pair of right and left eye images formed on the dispersion panel into the right and left eyes of a viewer upon separating the images in each of the separating function portions, a sensor for detecting the position of the viewer, and light transmitting portion controlling means for changing the positions of the light transmitting portions in the light shading means on the basis of an output of the sensor.

Consequently, the position of the light transmitting portion in the light shading means is changed depending on the position of the viewer, the pair of right and left eye images formed on the dispersion panel is shifted in the predetermined region by the change in the position, and it is possible for the viewer which moved to properly view the stereoscopic image by the shift in positions where the images are formed (hereinafter referred to as image forming positions).

The light shading means may be so constructed that two or more light transmitting portions can exist with respect to each of the predetermined regions of the dispersion panel in order that two or more pairs of right and left eye images exist in the predetermined region, and the light transmitting portion controlling means may be so constructed that the positions of the light transmitting portions are individually changed depending on the position of each of two or more viewers. Consequently, the stereoscopic image can be viewed by two or more viewers. Even when the stereoscopic image is thus viewed by two or more viewers, the positions of the light transmitting portions are individually changed depending on the position of each of the viewers, whereby the respective viewers can properly view the stereoscopic image.

The light transmitting portion controlling means carries out such control that two or more light transmitting portions provided with respect to each of the predetermined regions of the dispersion panel are not adjacent to each other. Consequently, it is possible to prevent the opening widths of the light transmitting portions from being undesirably increased by causing the light transmitting portions to be adjacent to each other. Further, one or two or more viewers are detected by the sensor, so that the number of light transmitting portions in the light shading means which correspond to each of the predetermined regions may be set in conformity with the number of viewers.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS (Embodiment 1)

Embodiments of the present invention will be described on the basis of the drawings.

Figure 1:
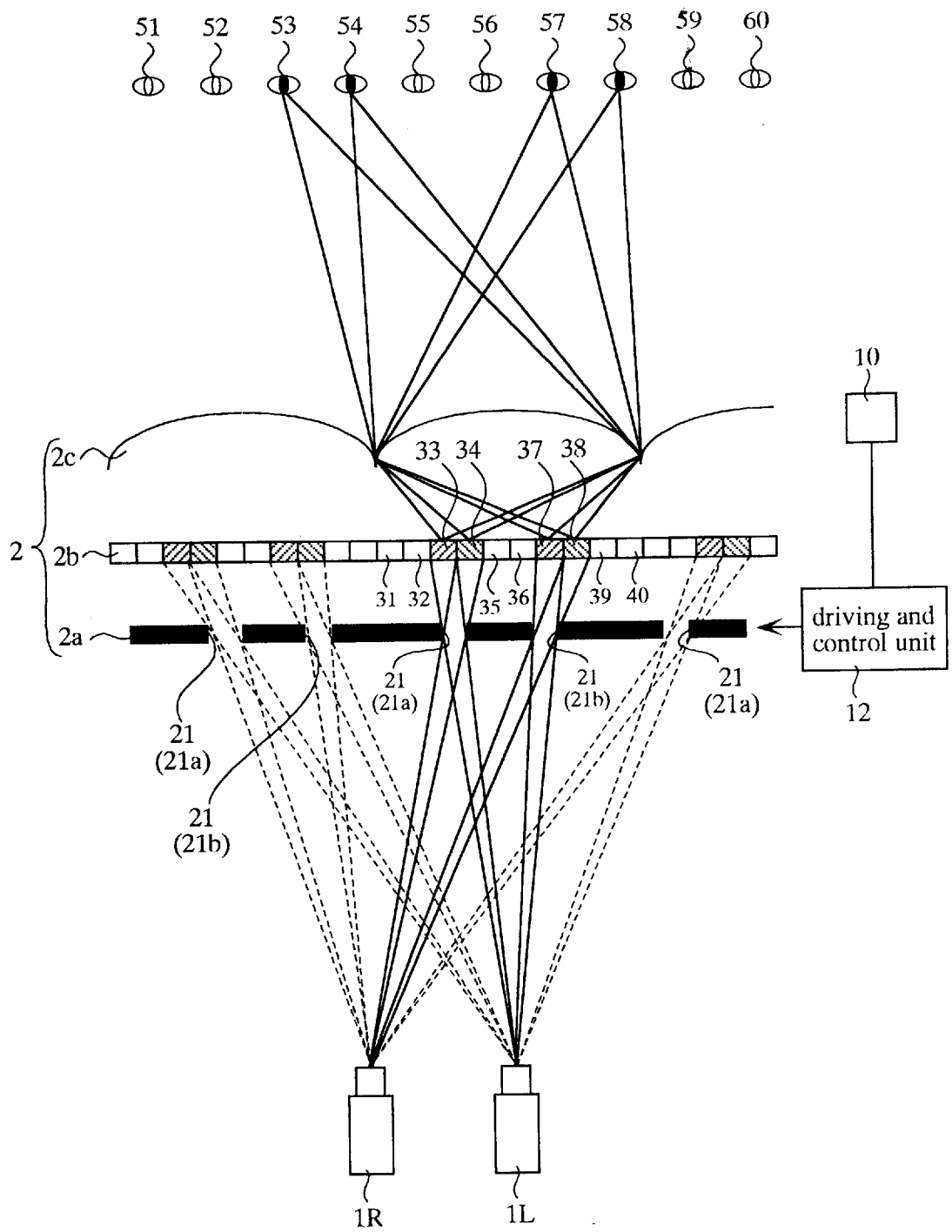
FIG. 1 is a schematic view showing the construction of a stereoscopic display according to an embodiment 1 of the present invention.

FIG. 1 is a schematic diagram showing the construction of a stereoscopic display according to the present embodiment. The stereoscopic display comprises a screen 2, a first projector 1L, a second projector 1R, a sensor 10 for detecting the position of the head of a viewer (the positions of the eyes of the viewer), and a driving and control unit 12 for driving and controlling light shading means 2a in the screen 2 depending on the detected value of the sensor 10.

The first projector 1L projects a left eye image, and the second projector 1R projects a right eye image. A liquid crystal display (LCD) projector, for example, is used as the projectors 1L and 1R.

The screen 2 comprises a dispersion panel 2b serving as an image display surface, light shading means 2a arranged on the incidence side of the dispersion panel 2b, and a lenticular lens 2c which is separating means arranged on the emission side of the dispersion panel 2b. The light shading means 2a has light transmitting portions 21 for forming the right and left eye images projected from the respective projectors 1L and 1R in a vertical stripe shape on the dispersion panel 2b. In the present embodiment, the light shading means 2a is composed of a TN-type (Twisted Nematic) LC panel. The type of the LC panel is not limited to the TN type. An LC panel of the other type may be used. Further, a dispersion type LC panel can be also used. The lenticular lens 2c introduces the vertically striped images formed on the dispersion panel 2b into the right and left eyes of the viewer upon separating the images.

The width of the light transmitting portion 21 is so set that two or more pairs of right and left eye images can be formed in an image forming region (a predetermined region) on the dispersion panel 2b corresponding to one lens portion (a separating function portion) in the lenticular lens 2c. In the embodiment, in the image forming region (reference numerals 31 to 40 are assigned to respective positions obtained by subdividing the region) on the dispersion panel 2b corresponding to one lens portion, striped images are respectively formed, so that a maximum of five pairs of right and left eye images can be simultaneously formed. Consequently, 10 (n=10) portions to be the light transmitting portions 21 are provided with respect to one lens portion in the lenticular lens 2c. The details thereof will be described later. The magnification of each of the lens portions is increased, as compared with that in a case where one pair of right and left eye images is formed.

Figure 2A:
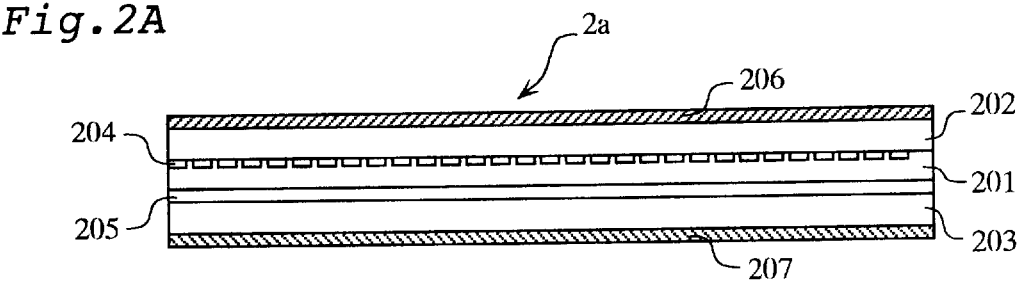
FIG. 2A is a cross-sectional view of a liquid crystal panel (hereinafter referred to as LC panel) constituting light shading means in the present invention.

The light shading means 2a composed of the LC panel is driven and controlled by the above-mentioned driving and control unit 12. The LC panel composing the light shading means 2a comprises a liquid crystal layer 201, a pair of transparent glass plates 202 and 203 provided with the liquid crystal layer 201 interposed therebetween, a stripe pattern portion 204 composed of ITO (indium tin oxide) provided on a surface, on the side of the liquid crystal layer, of the transparent glass plate 202 and constituting one transparent electrode, a solid pattern portion 205 composed of ITO provided on a surface, on the side of the liquid crystal layer, of the transparent glass plate 203 and constituting the other transparent electrode, and polarizing plates 206 and 207 respectively provided on surfaces, on the opposite side of the liquid crystal layer, of the transparent glass plates, as shown in a cross-sectional view of FIG. 2A. The stripe pattern portion 204 is so adapted that a lot of vertically striped ITO films are arranged at a predetermined pitch, and the width of a stripe of the ITO films corresponds to the width of (the pitch between) the light transmitting portions 21.

Figure 2B:
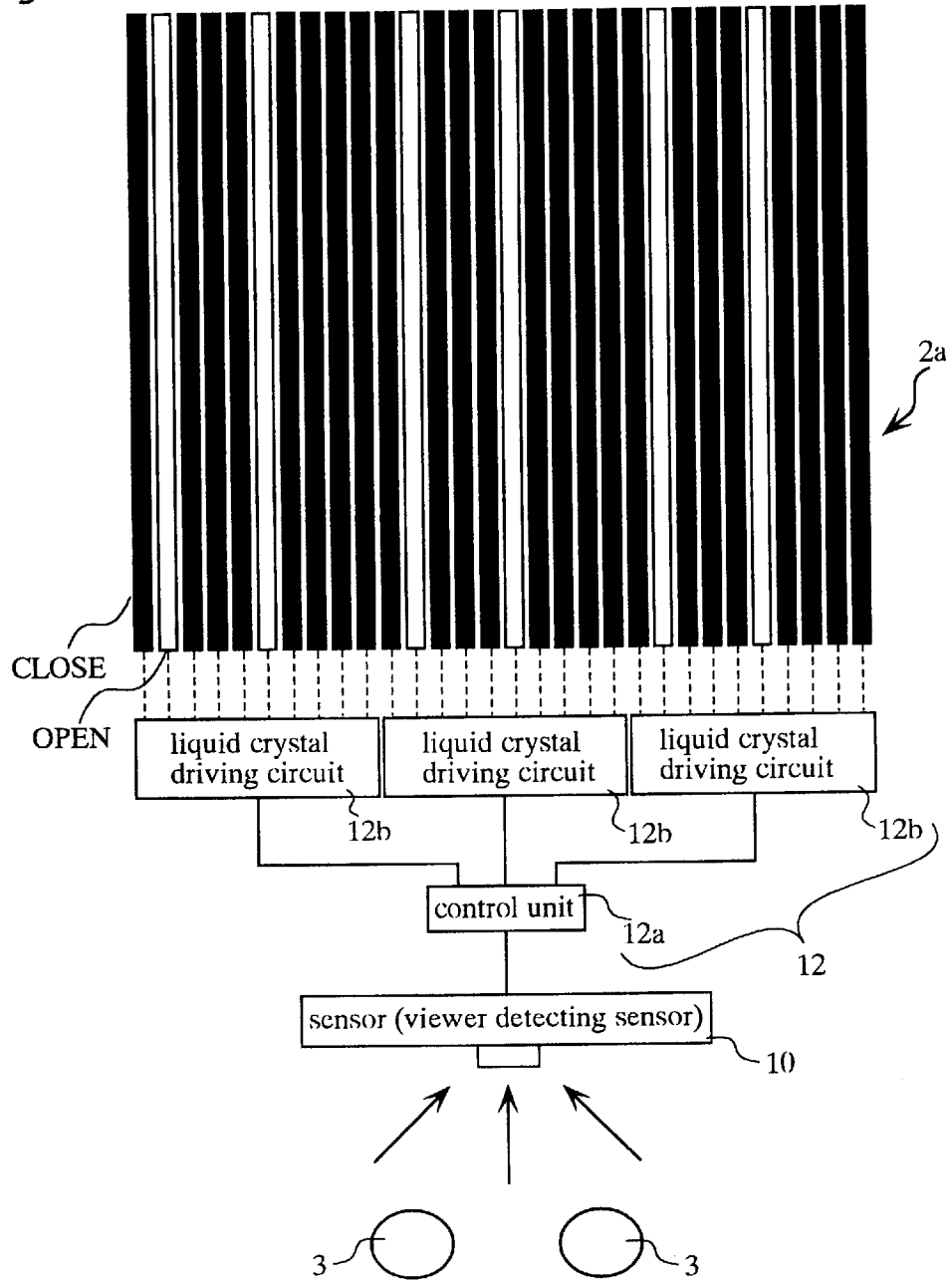
FIG. 2B is a system diagram showing the LC panel and driving means for driving the LC panel.

FIG. 2B is a diagram showing a system for driving the LC panel composing the light shading means 2a. The driving and control unit 12 comprises a control unit 12a composed of a microcomputer and liquid crystal driving circuits 12b. The control unit 12a feeds signals to the liquid crystal driving circuits 12b depending on the position of the viewer 3 on the basis of an output of the sensor 10. Each of the liquid crystal driving circuits 12b forms a light transmitting state or a light shading state in a liquid crystal layer portion corresponding to arbitrary vertically striped ITO films in the stripe pattern portion 204 by applying (or not applying) a voltage to the vertically striped ITO films depending on the signal, to change the positions of the light transmitting portions 21. The one liquid crystal driving circuit 12b takes charge of the driving of the 10 (n=10) vertically striped ITO films. The 10 vertically striped ITO films correspond to the one lens portion. The respective images from the projectors 1L and 1R can be formed in the positions (31 to 40) on the dispersion panel 2b corresponding to the one lens portion, as shown in FIG. 1, by turning the 10 vertically striped ITO films on and off.

Figure 3:
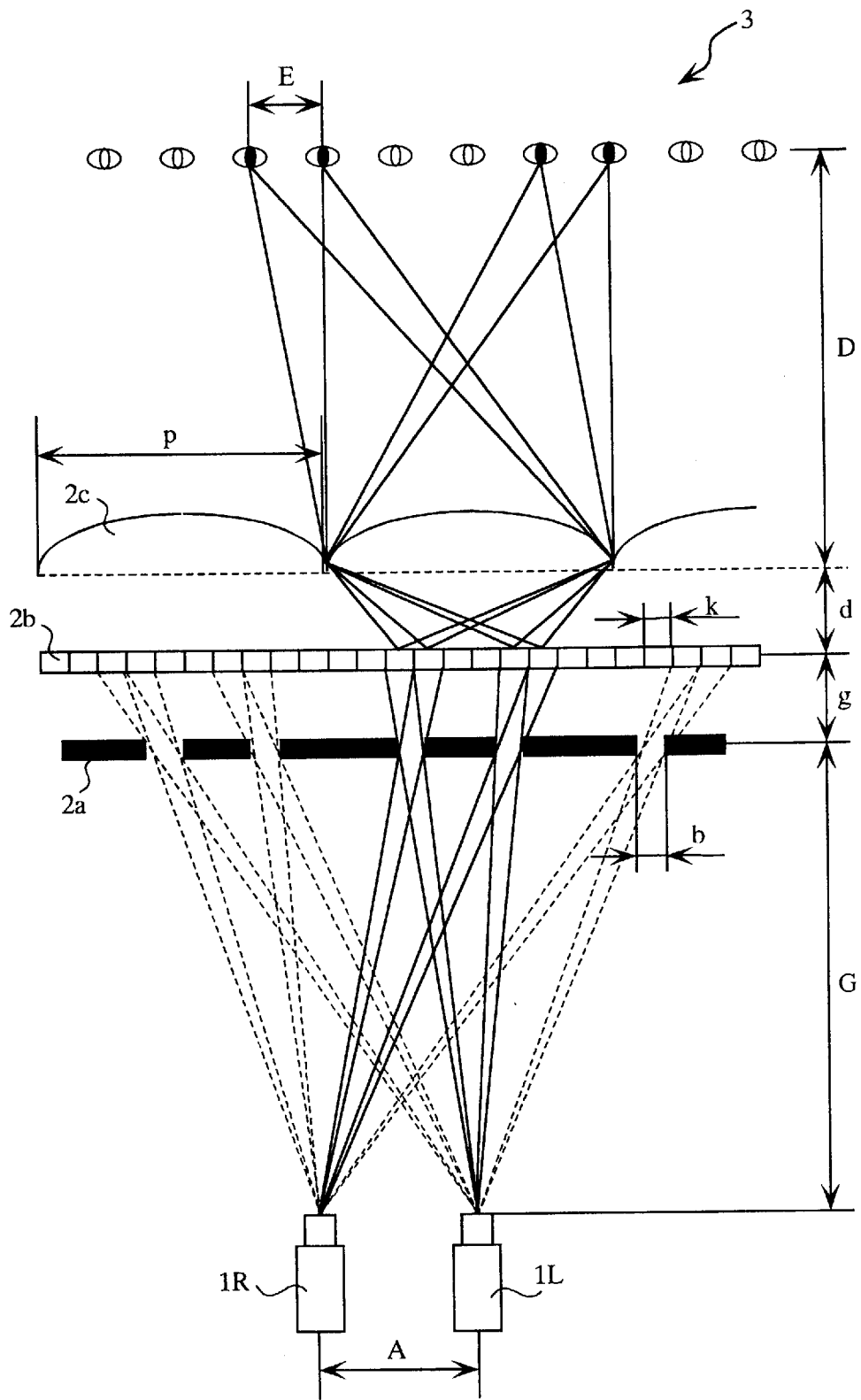
FIG. 3 is an explanatory view in which the dimensions and the like of respective portions of elements constituting the stereoscopic display according to the embodiment 1 of the present invention are given.

FIG. 3 is a diagram in which the dimensions and the like of respective portions of elements constituting the stereoscopic display according to the present embodiment are given. In FIG. 3, the following are defined:

A: the distance between a light emitting point of the first projector 1L and a light emitting point of the second projector 1R G: the distance between each of the projectors 1L and 1R and the light shading means 2a g: the distance between the light shading means 2a and the dispersion panel 2b k: the pitch between vertically striped images on the dispersion panel 2b E: the distance between the eyes of the viewer 3 d: the distance between the dispersion panel 2b and the lens center of the lenticular lens 2c D: the distance between the lens center of the lenticular lens 2c and the viewer 3 p: the pitch between the lens portions (the separating function portions) in the lenticular lens 2c b: the unit quantity of movement of the light transmitting portion 21 in the light shading means 2a In the stereoscopic display of such construction, the following conditions are satisfied:

| | |
|---|---|
| g:k = G:A | . . . first equation |
| k:(G + g) = b:G | . . . second equation |
| E:D = k:d | . . . third equation |
| p:D = nk:(D + d) | . . . fourth equation |
| where n = 10 | |
| nk:(G + g) = nb:G | . . . fifth equation |
| 1/d + 1/D = 1/f | . . . sixth equation |

The following seventh to eleventh equations are derived from the foregoing equations:

| | |
|---|---|
| k = gA/G | . . . seventh equation |
| b = gA/(g + G) | . . . eighth equation |
| A = EdG/Dg | . . . ninth equation |
| p = nkD/(d + D) | . . . tenth equation |
| where n = 10 | |
| f = kD/(k + E) | . . . eleventh equation |

Description is now made of operations performed by the above-mentioned stereoscopic display. In the stereoscopic display shown in FIG. 1, the width of (that is, the pitch b between) the light transmitting portions 21 is so set that a maximum of five pairs of right and left eye images can be simultaneously formed in an image forming region on the dispersion panel 2b which corresponds to the one lens portion in the lenticular lens 2c. When five pairs of right and left eye images are formed, therefore, a maximum of five viewers 3 can view a stereoscopic image by respectively positioning their right and left eyes in predetermined positions (51, 52), (53, 54), (55, 56), (57, 58), and (59, 60).

In the state shown in FIG. 1, it is assumed that the number of light transmitting portions 21 in the light shading means 2a which correspond to one lens portion is two. One of the light transmitting portions 21a is formed in correspondence to the positions 33 and 34 on the dispersion panel 2b, while the other light transmitting portion 21b is formed in correspondence to the positions 37 and 38 on the dispersion panel 2b. Therefore, two viewers, that is, a viewer whose eyes are positioned in 57 and 58 and a viewer whose eyes are positioned in 53 and 54 recognize a stereoscopic image.

Figure 4:
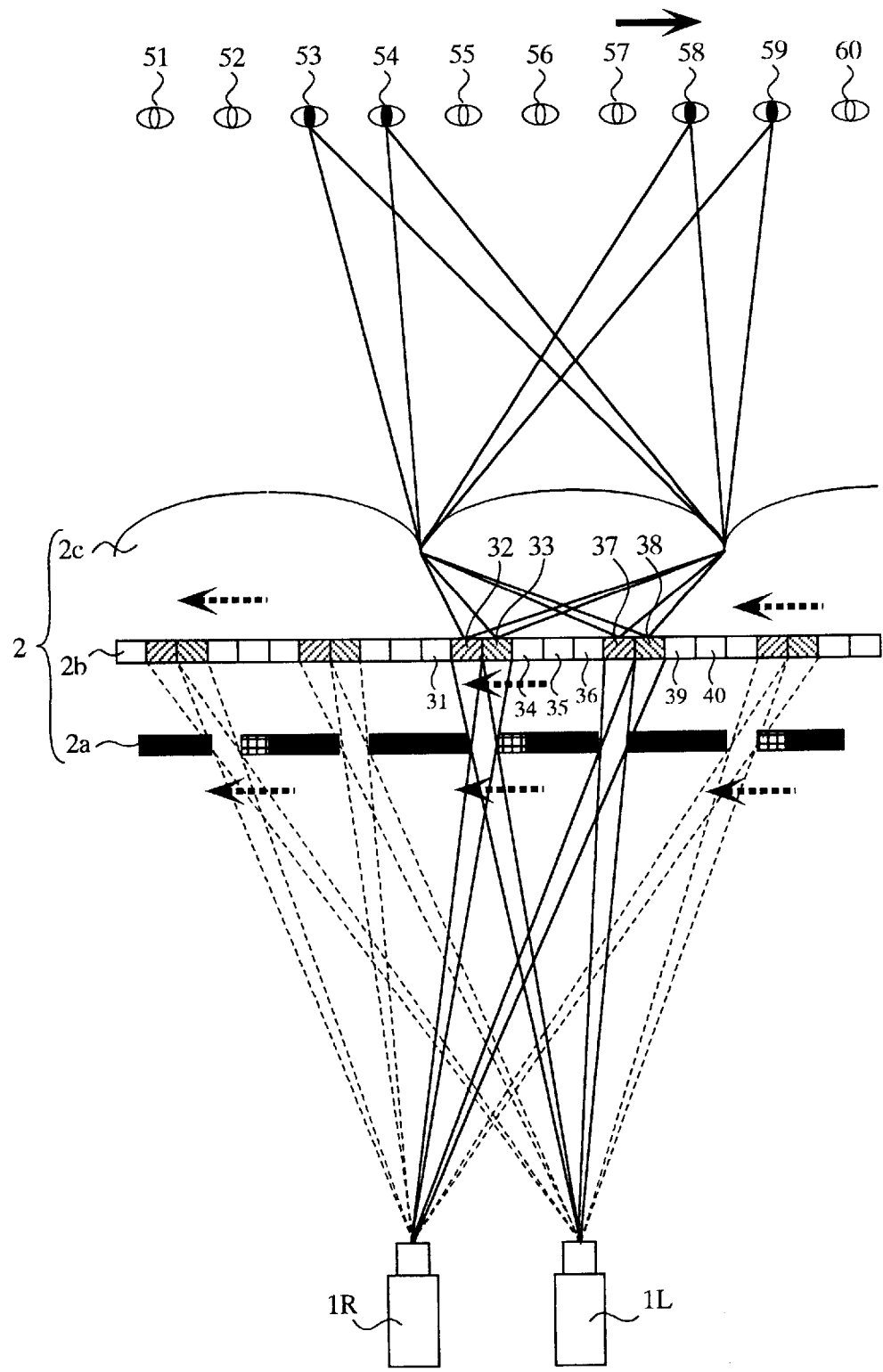
FIG. 4 is an explanatory view showing how light transmitting portions in light shading means are changed in a case where only one viewer moves in the stereoscopic display according to the embodiment 1 of the present invention.

Suppose only the viewer 3 whose eyes are positioned in 57 and 58 moves rightward in FIG. 1, so that both the eyes are positioned in 58 and 59, as shown in FIG. 4. Consequently, the sensor 10 detects the movement of the viewer 3, and the driving and control unit 12 changes only the light transmitting portion 21a (see FIG. 1) leftward by the width of one stripe, that is, one pitch b depending on the position of the viewer 3 on the basis of an output of the sensor 10.

Description is made of the change in the position of the light transmitting portion 21a using FIG. 2. A liquid crystal layer portion on the ITO films corresponding to the light transmitting portion 21a out of the 10 ITO films shall be brought into a light shading state (this state is represented by crosshatching in FIG. 4), and a liquid crystal layer portion on the adjacent ITO film on the left side shall be brought into a light transmitting state.

Since the position of the light transmitting portion 21 in the light shading means 2a is thus changed depending on the position of the viewer 3, image forming positions (33, 34) of the pair of right and left eye images on the dispersion panel 2b are changed into the positions (32, 33) by the change, and it is possible for the viewer 3 which moved to properly view a stereoscopic image by the change in the image forming positions.

Even when the stereoscopic display is viewed by a lot of viewers, the positions of the two light transmitting portions 21a and 21b are individually changed depending on the position of each of the viewers 3, as described above, so that the respective viewers can properly view a stereoscopic image.

When the plurality of light transmitting portions 21 are adjacent to each other, a right eye image and a left eye image are simultaneously projected on the same position on the dispersion panel 2b, whereby the right and left images cannot be separated from each other with respect to the viewer. In the present embodiment, therefore, such control is carried out that the plurality of light transmitting portions 21 are not adjacent to each other in the driving and control unit 12.

In the state shown in FIG. 1, in the case of only the viewer 3 whose eyes are positioned in 57 and 58, if the light transmitting portion 21b whose need is eliminated remains opened, right and left images are overlapped with each other when the one viewer positions his or her eyes in portions near 58 and 59, whereby the right and left images cannot be separated from each other with respect to the viewer. Therefore, the above-mentioned problem can be avoided by detecting each of the viewers by the sensor 10, setting the number of light transmitting portions 21 in the light shading means 2a which correspond to the one lens portion in the lenticular lens 2c in conformity with the number of viewers, that is, bringing the light transmitting portion 21b whose need is eliminated into a light shading state.

(Embodiment 2)

Description is now made of another embodiment of the present invention on the basis of drawings.

Figure 5:
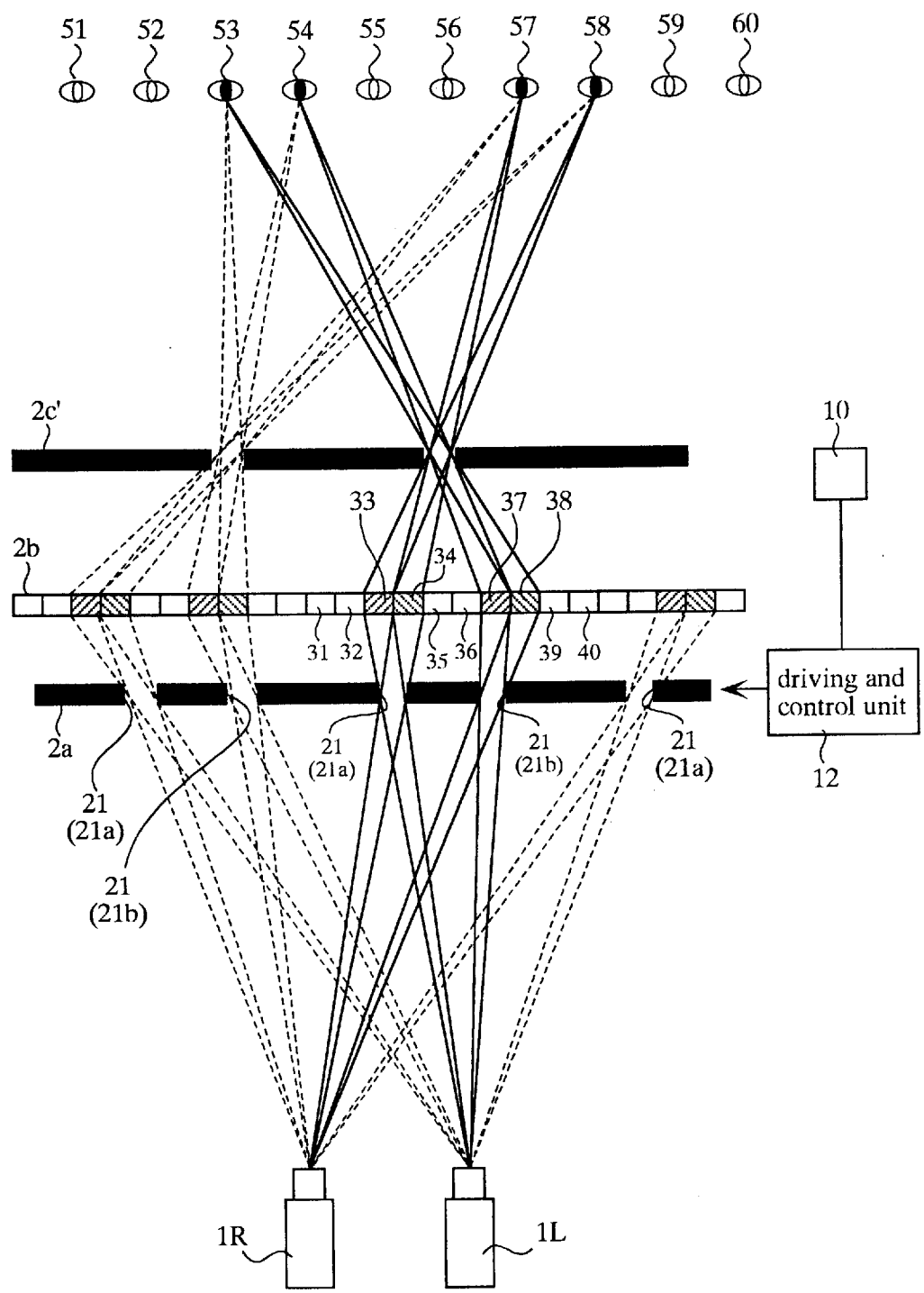
FIG. 5 is a schematic view showing the construction of a stereoscopic display according to an embodiment 2 of the present invention.

FIG. 5 is a schematic diagram showing the construction of a stereoscopic display according to the present embodiment. The difference from the embodiment 1 is that a parallax barrier 2c' is used as separating means. In the parallax barrier 2c', one slit constitutes one separating function portion.

Figure 6:
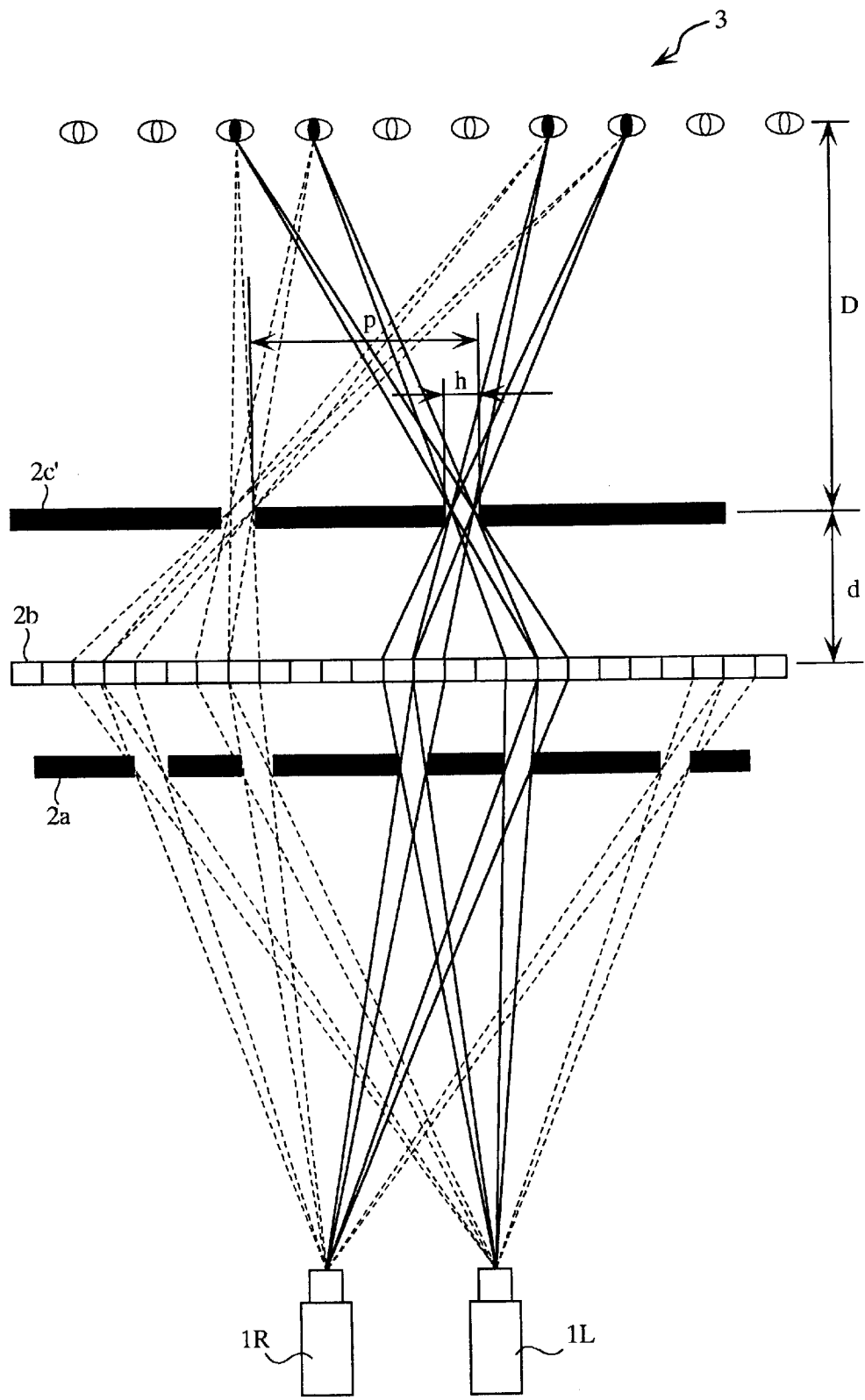
FIG. 6 is an explanatory view in which the dimensions and the like of respective portions of elements constituting the stereoscopic display according to the embodiment 2 of the present invention are given.

FIG. 6 is a diagram in which in the stereoscopic display according to the second embodiment, the dimensions and the like of respective portions of elements constituting the stereoscopic display are given, which are defined as follows:

d: the distance between a dispersion panel 2b and the center of the parallax barrier 2c' which is the separating means p: the pitch between the slits (the separating function portions) in the parallax barrier 2c' h: the maximum value of the width of the slit in the parallax barrier 2c'

D: the distance between the parallax barrier 2c' and a viewer 3

Also in this construction, the first equation to the fifth equation shown in the embodiment 1 are satisfied. Further, the following relationship expressed by a twelfth equation is also satisfied:

$$D:h=(D+d):k \qquad \text{twelfth equation}$$

The following thirteenth equation is derived by the foregoing twelfth equation:

$$h=kD/(D+d) \qquad \text{thirteenth equation}$$

Figure 7:
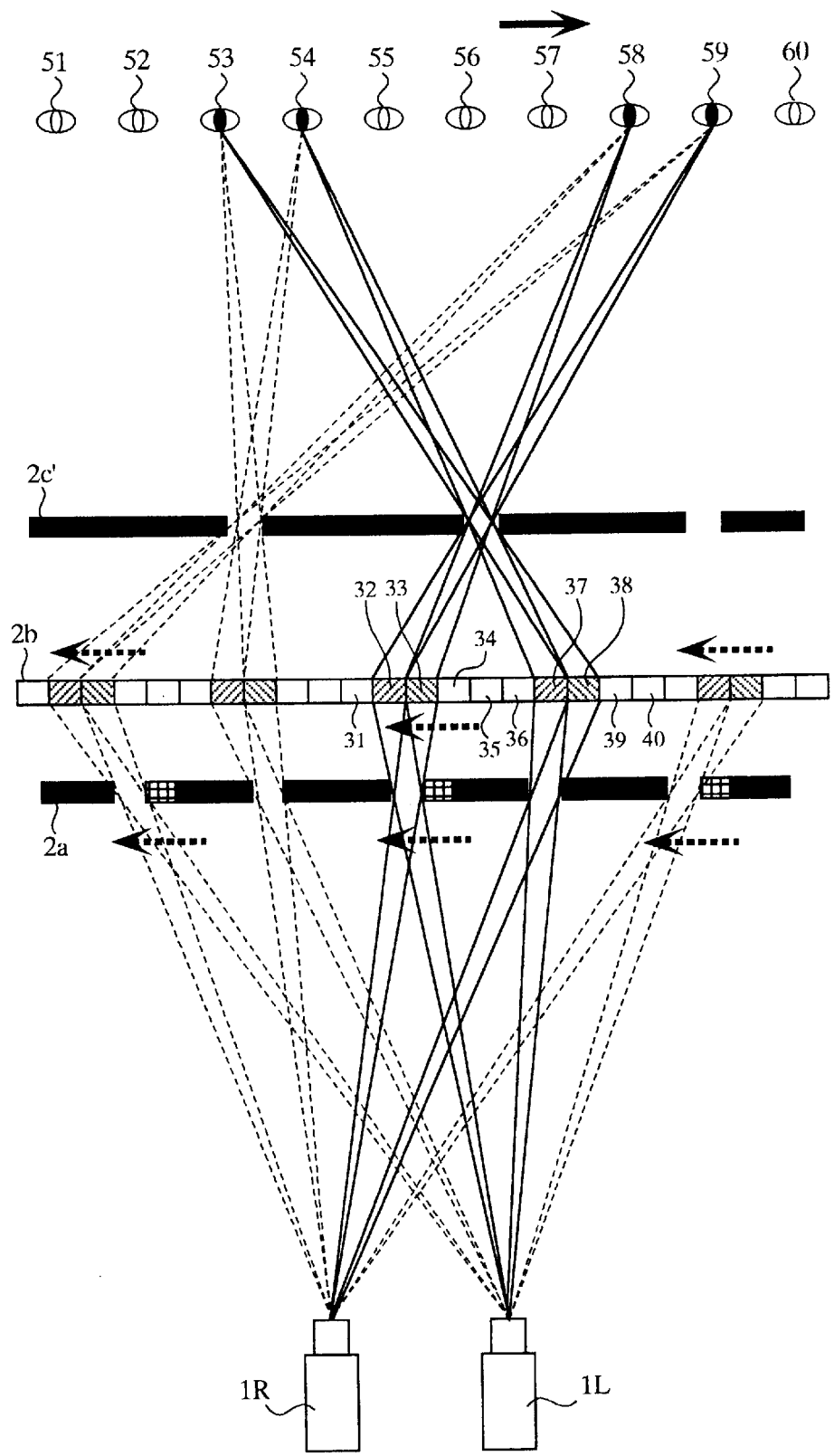
FIG. 7 is an explanatory view showing how light transmitting portions in light shading means are changed in a case where only one viewer moves in the stereoscopic display according to the embodiment 2 of the present invention.

In the above-mentioned construction, when the viewer 3 moves rightward, from the position shown in FIG. 5 to the position shown in FIG. 7, so that his or her eyes are positioned in 58 and 59, a sensor 10 detects the movement of the viewer 3, and a driving and control unit 12 changes the light transmitting portion 21a leftward by the width of one stripe depending on the position of the viewer 3 on the basis of an output of the sensor 10. Image forming positions (33, 34) of right and left eye striped images on the dispersion panel 2b are changed into positions (32, 33) by the change in the position of the light transmitting portion 21a, and it is possible for the viewer 3 which moved to properly view a stereoscopic image by the change in the image forming positions. Even when the stereoscopic display is viewed by a lot of viewers 3, the positions of the two light transmitting portions 21a and 21b are individually changed depending on the position of each of the viewers 3, whereby the respective viewers can properly view a stereoscopic image.

Figure 8:
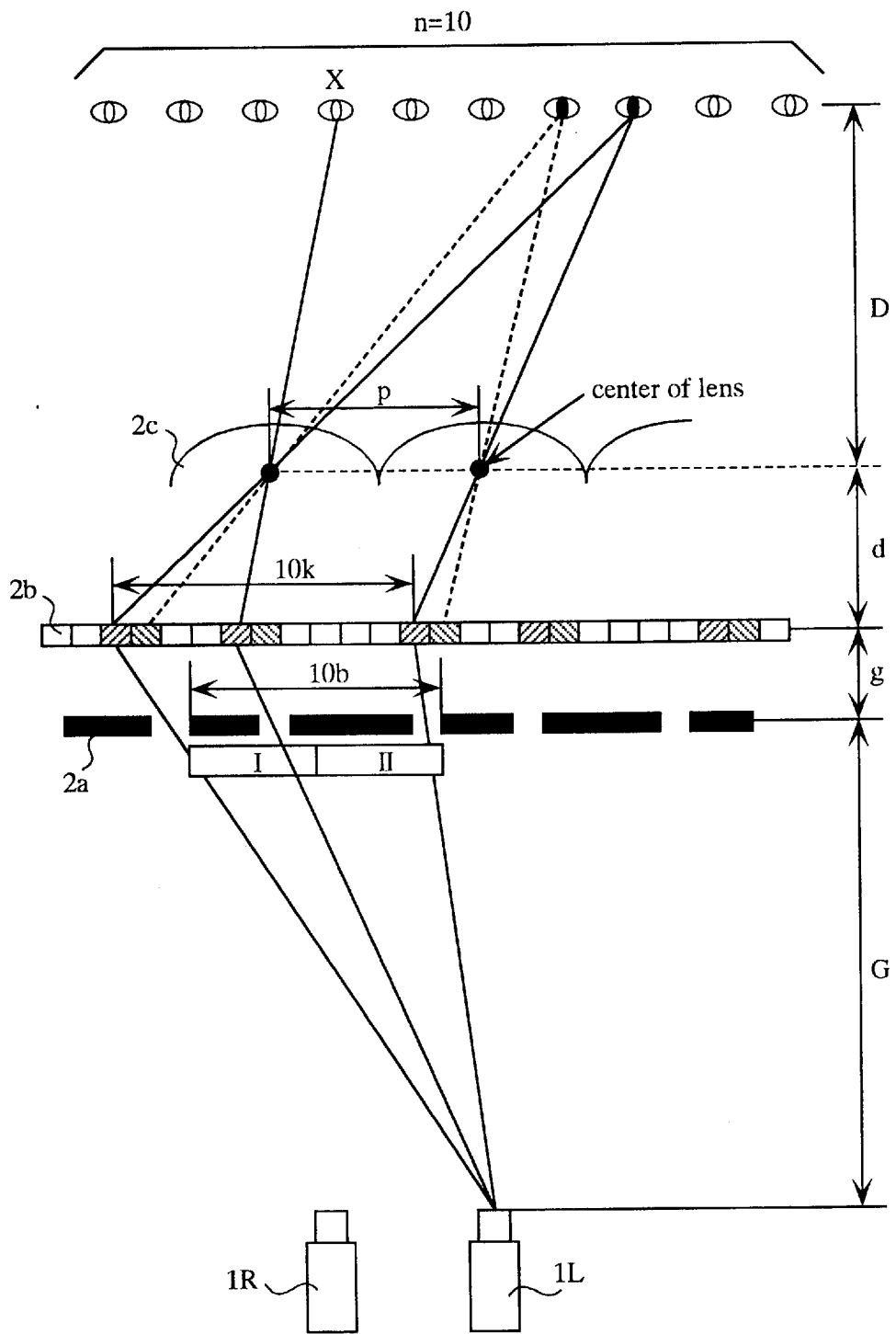
FIG. 8 is an explanatory view showing a case where image information corresponding to two pixels is supplied to one separating function portion in separating means in the present invention.
Figure 9:
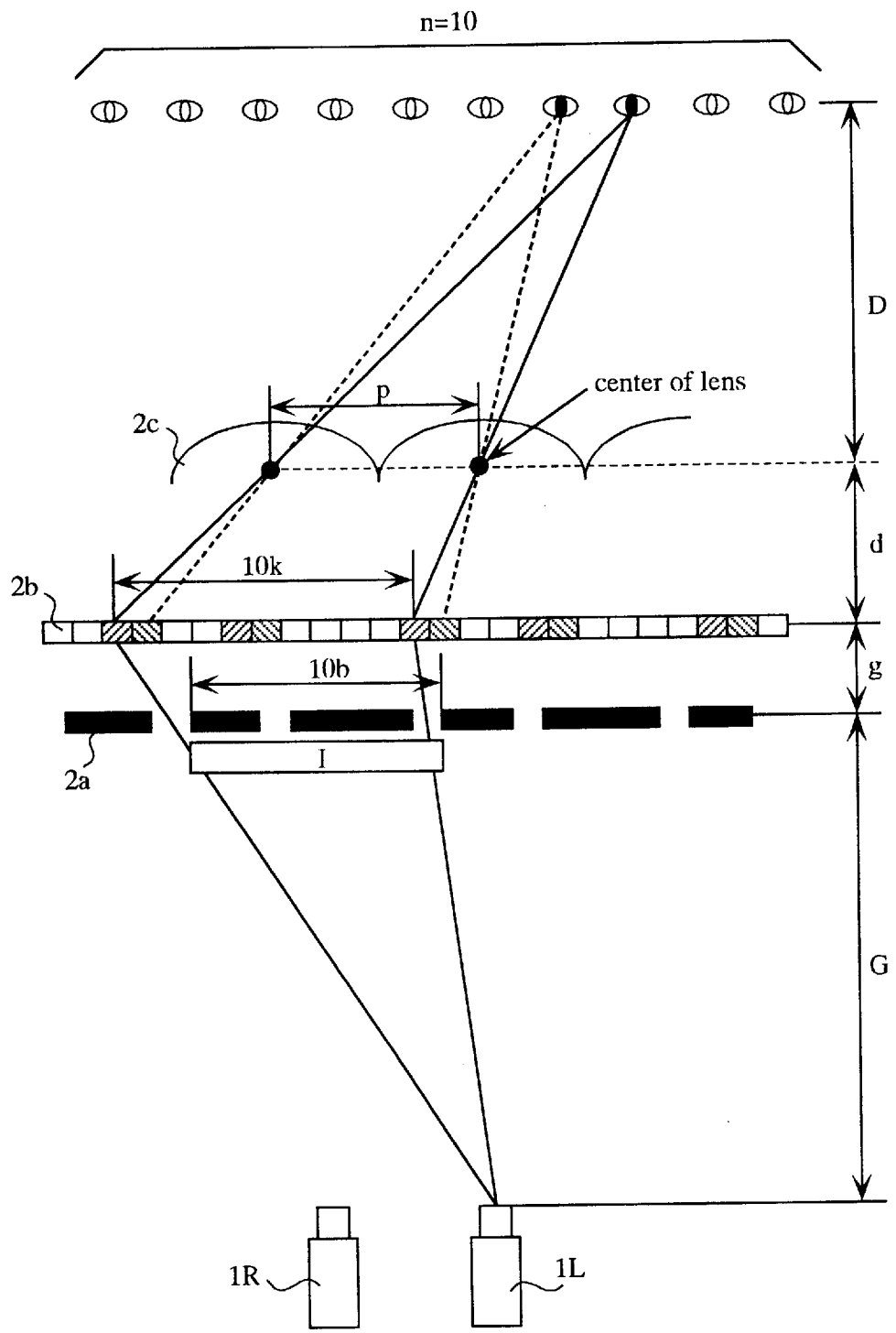
FIG. 9 is an explanatory view showing a case where image information corresponding to not more than one pixel is supplied to one separating function portion in separating means in the present invention.
Figure 10:
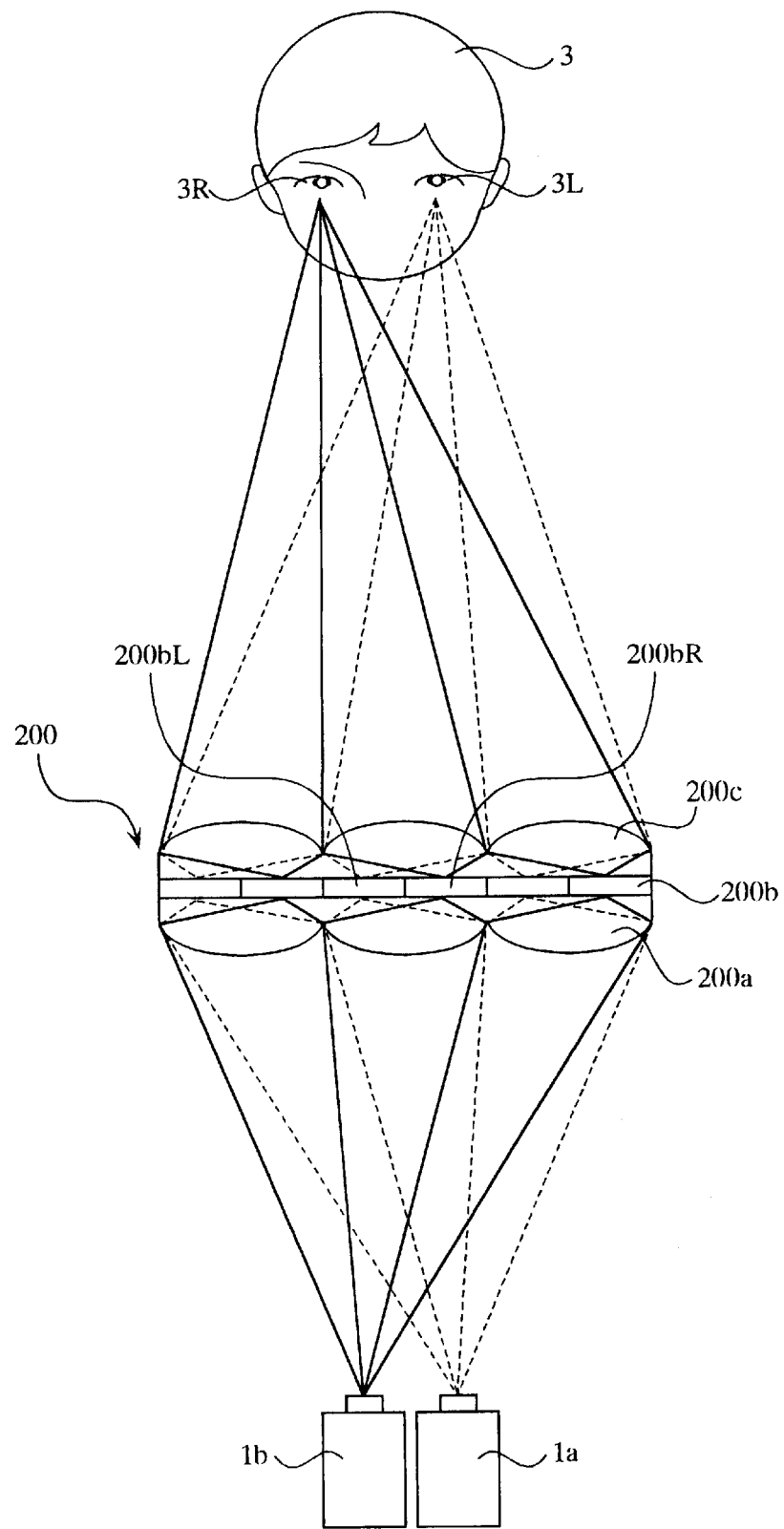
FIG. 10 is a schematic view showing the construction of a conventional stereoscopic display.
Figure 11:
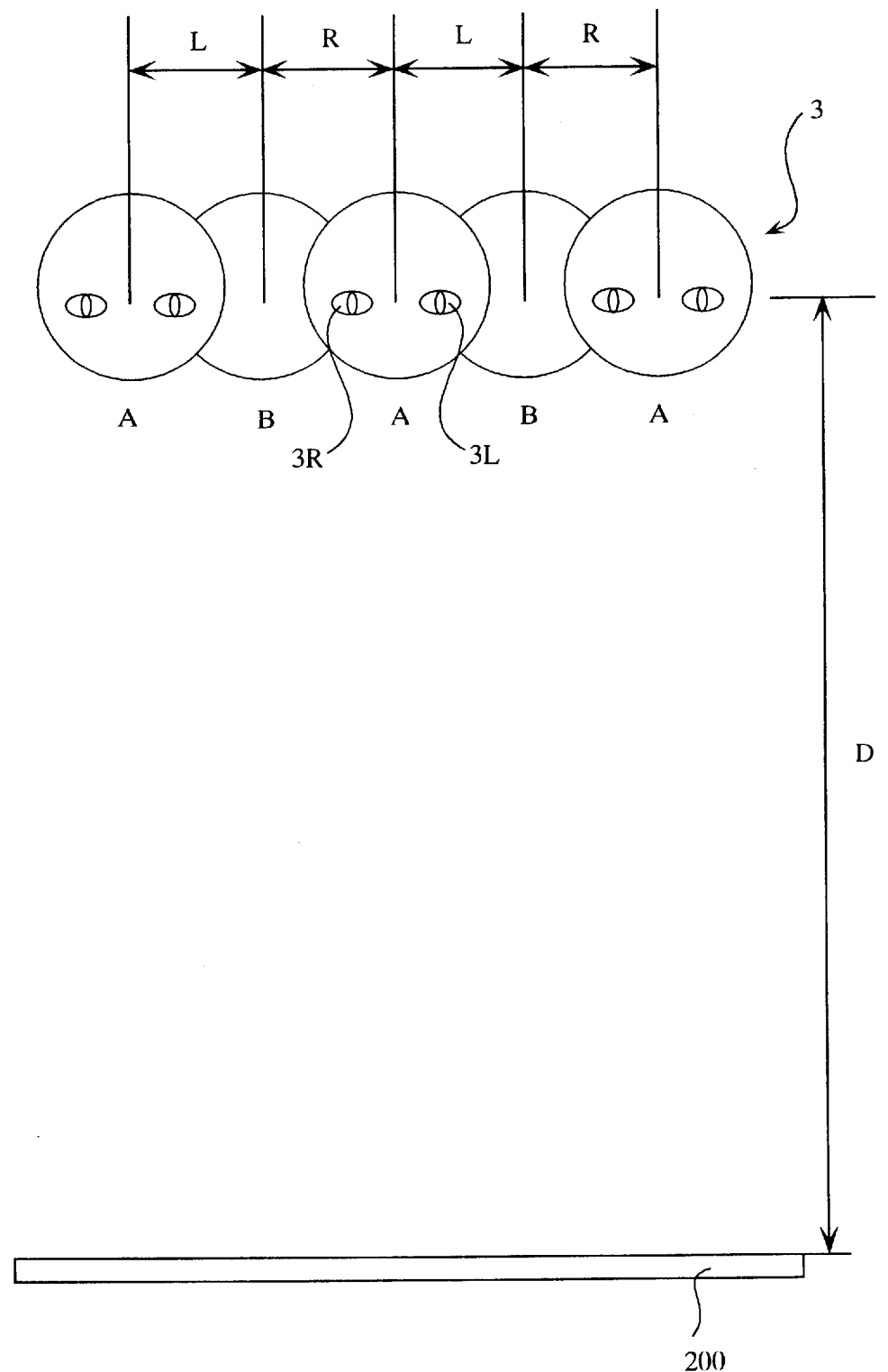
FIG. 11 is an explanatory view showing the relationship between a just viewing position and a reversed viewing position.
Figure 12:
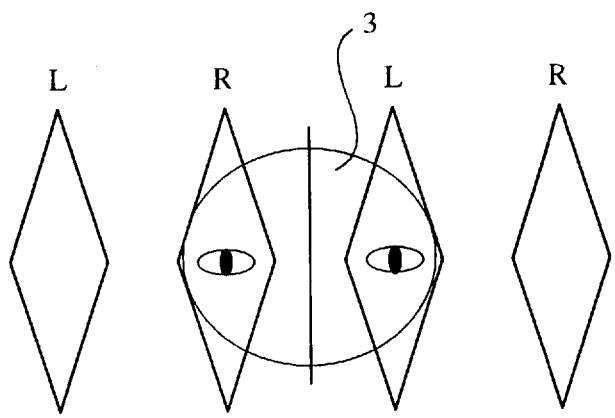
FIG. 12 is an explanatory view showing a state where right and left images are projected without being replaced with each other on a viewer in a just viewing position by a conventional stereoscopic display comprising a sensor for detecting the position of the head of the viewer.
Figure 12:
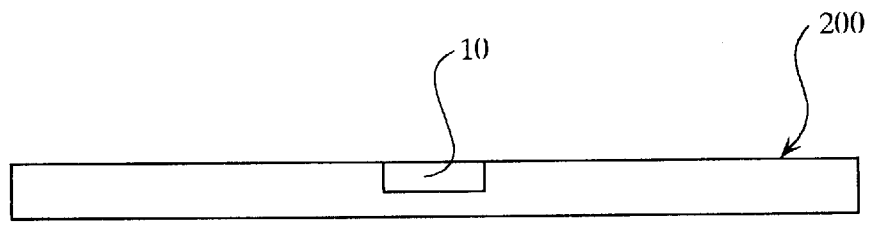
Figure 13:
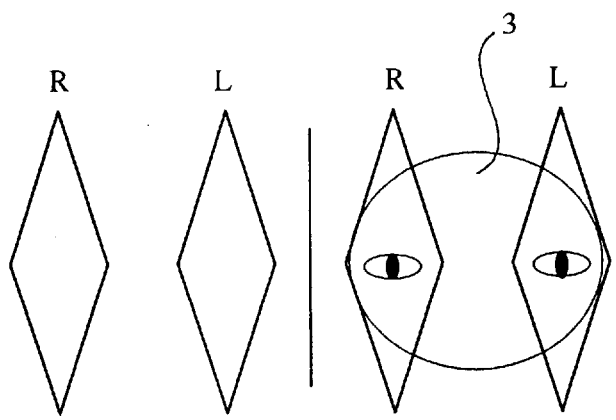
FIG. 13 is an explanatory view showing a state where right and left images are projected upon being replaced with each other on a viewer in a reversed viewing position by a conventional stereoscopic display comprising a sensor for detecting the position of the head of a viewer.
Figure 13:
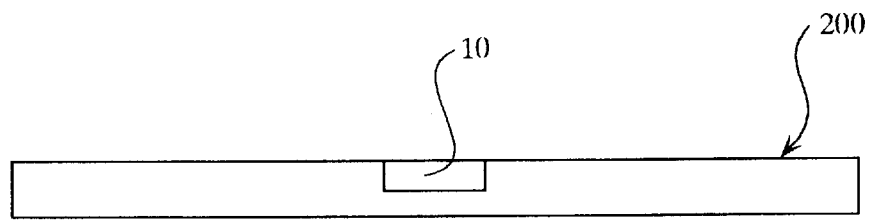

It is desirable that image information corresponding to not more than one pixel are respectively supplied from the two projectors to one separating function portion in the lenticular lens 2c or the parallax barrier 2c'. The reason for this is that when the image information corresponding to more than one pixels are supplied, pixels which cannot be seen depending on the viewing position are produced, resulting in reduced resolution. FIG. 8 illustrates a case where image information corresponding to two pixels (a pixel I and a pixel II) is supplied to one separating function portion in the lenticular lens 2c which is separating means, and FIG. 9 illustrates a case where image information corresponding to not more than one pixel (a pixel I) is supplied to one separating function portion in the lenticular lens 2c. As can be seen from FIGS. 8 and 9, when the viewer moves to be positioned in X in FIG. 8, the pixel II is not seen, whereby the resolution is reduced. On the other hand, even if the viewer positions his or her eyes in any of 10 positions in FIG. 9, there is no possibility that the pixel I is not seen, whereby the resolution is prevented from being reduced.

As described in the foregoing, according to the present invention, the position of the light transmitting portion in the light shading means is changed depending on the position of the viewer, and the stereoscopic image can be properly viewed by the viewer which moved. Even when a lot of viewers view the stereoscopic display, the positions of the light transmitting portions are individually changed depending on each of the positions of the viewers. Therefore, several effects are produced. For example, the respective viewers can properly view the stereoscopic image.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A stereoscopic display comprising:

a first projector for projecting a left eye image;

a second projector for projecting a right eye image;

a dispersion panel on which the images projected from said projectors are formed;

light shading means having a plurality of light transmitting portions for transmitting image light beams from the projectors to form pairs of right and left eye images on said dispersion panel, and being so constructed that the width of each of the light transmitting portions is so small that two or more pairs of right and left eye images can exist in each of predetermined regions of the dispersion panel, and the position of each of the light transmitting portions can be shifted in the transverse direction;

separating means comprising separating function portions respectively corresponding to the predetermined regions for introducing the pair of right and left eye images formed on said dispersion panel into the right and left eyes of a viewer upon separating the images in each of the separating function portions;

a sensor for detecting the position of the viewer; and light transmitting portion controlling means for changing the positions of the light transmitting portions in said light shading means on the basis of an output of said sensor.

2. The stereoscopic display according to claim 1, wherein said light shading means is so constructed that two or more light transmitting portions can exist with respect to each of the predetermined regions of said dispersion panel in order that two or more pairs of right and left eye images exist in the predetermined region, and said light transmitting portion controlling means is so constructed that the positions of said light transmitting portions are individually changed depending on the position of each of two or more viewers.

3. The stereoscopic display according to claim 2, wherein said light transmitting portion controlling means carries out such control that two or more light transmitting portions provided with respect to each of the predetermined regions of said dispersion panel are not adjacent to each other.

4. The stereoscopic image display according to claim 2, wherein one or two or more viewers are detected by said sensor, and the number of light transmitting portions in said light shading means which correspond to each of the predetermined regions is set in conformity with the number of viewers.

5. The stereoscopic display according to claim 1, wherein letting A be the distance between a light emitting point of said first projector and a light emitting point of said second projector, G be the distance between each of the projectors and said light shading means, and g be the distance between the light shading means and the dispersion panel, the unit quantity of movement b of said light transmitting portion is set to $b=gA/(g+G)$, and the pitch k between the images on the dispersion panel is set to $k=gA/G$.

6. The stereoscopic display according to claim 1, wherein letting A be the distance between a light emitting point of said first projector and a light emitting point of said second projector, E be the distance between the eyes of a viewer, d be the distance between the dispersion panel and the center of the separating means, and D be the distance between the center of the separating means and the viewer, the distance A is set to $A=EdG/Dg$.

7. The stereoscopic display according to claim 1, wherein letting k be the pitch between the images on the dispersion panel, d be the distance between the dispersion panel and the center of the separating means, D be the distance between the center of the separating means and the viewer, and n be an integer, the pitch p between the separating function portions in said separating means is set to $p=nkD/(d+D)$.

8. The stereoscopic display according to claim 1, wherein letting n be an integer and b the unit quantity of movement of said light transmitting portion, nb is a pitch between the light transmitting portions produced on said light shading means, corresponding to a viewer.

9. The stereoscopic display according to claim 1, wherein letting k be the pitch between the images on the dispersion panel, D be the distance between the center of the separating means and the viewer, and E be the distance between the eyes of the viewer, when said separating means is composed of a lenticular lens, the focal length f of the lenticular lens is set to $f=kD/(k+E)$.

10. The stereoscopic display according to claim 1, wherein letting k be the pitch between the images on the dispersion panel, d be the distance between the dispersion panel and the center of the separating means, and D be the distance between the separating means and the viewer, when said separating means is composed of a parallax barrier, the maximum value h of the width of a slit of the parallax barrier is set to $h=kD/(D+d)$.

11. The stereoscopic display according to claim 1, wherein the direction in which the positions of the light transmitting portions in the light shading means are changed is a direction opposite to the direction in which the viewer moves, and the positions of said light transmitting portions are changed by the unit quantity of movement every time the viewer moves by the distance between the eyes of the viewer.

12. The stereoscopic display according to claim 1, wherein said light shading means is composed of a liquid crystal panel.

13. The stereoscopic display according to claim 1, wherein image information corresponding to not more than one pixel are respectively supplied from said two projectors to the one separating function portion in said separating means.

* * * * *